(12) United States Patent
Catalan (10) Patent No.: US 9,787,149 B2
(45) Date of Patent: Oct. 10, 2017

(54) HALBACH ARRAY ELECTRIC MOTOR WITH SUBSTANTIALLY CONTIGUOUS ELECTROMAGNETIC CORES

(71) Applicant: Roberto Sanchez Catalan, Lorton, VA (US)

(72) Inventor: Roberto Sanchez Catalan, Lorton, VA (US)

(\*) Notice: Subject to any disclaimer, the term of this patent is extended or adjusted under 35 U.S.C. 154(b) by 64 days.

(21) Appl. No.: 15/046,406

(22) Filed: Feb. 17, 2016

(65) Prior Publication Data

US 2016/0164353 A1    Jun. 9, 2016

Related U.S. Application Data

(63) Continuation of application No. 14/014,153, filed on Aug. 29, 2013, now Pat. No. 9,302,577.

(51) Int. Cl.
| | |
|---|---|
| *H02K 1/27* | (2006.01) |
| *B60K 7/00* | (2006.01) |
| *H02K 21/12* | (2006.01) |
| *H02K 21/22* | (2006.01) |
| *H02K 41/03* | (2006.01) |
| *H02K 1/14* | (2006.01) |
| *H02K 1/17* | (2006.01) |
| *H02K 7/08* | (2006.01) |
| *H02K 16/00* | (2006.01) |
| *H02K 7/14* | (2006.01) |

(52) U.S. Cl.
CPC ............ *H02K 1/2706* (2013.01); *B60K 7/00* (2013.01); *B60K 7/0007* (2013.01); *H02K 1/148* (2013.01); *H02K 1/17* (2013.01); *H02K 7/08* (2013.01); *H02K 16/00* (2013.01); *H02K 21/12* (2013.01); *H02K 21/22* (2013.01); *H02K 41/031* (2013.01); *B60K 2007/0038* (2013.01); *B60K 2007/0092* (2013.01); *H02K 1/278* (2013.01); *H02K 1/2786* (2013.01); *H02K 7/14* (2013.01); *Y10T 29/49009* (2015.01)

(58) Field of Classification Search
CPC .......... H02K 1/2706; H02K 7/08; H02K 1/17; H02K 16/00; H02K 21/22; H02K 41/031; H02K 1/148; H02K 21/12; H02K 7/14; H02K 1/27; B60K 7/0007; B60K 7/00; B60K 2007/0038; B60K 2007/0092; Y10T 29/49009
See application file for complete search history.

(56) References Cited

U.S. PATENT DOCUMENTS

| | | |
|---|---|---|
| 5,705,902 A | 1/1998 | Merritt et al. |
| 6,841,910 B2 | 1/2005 | Gery |
| 6,858,962 B2 | 2/2005 | Post |
| 6,906,446 B2 | 6/2005 | Post |
| 7,031,116 B2 | 4/2006 | Subrahmanyan |
| 7,352,096 B2 | 4/2008 | Dunn et al. |
| 7,540,004 B2 | 5/2009 | Lee et al. |
| 7,541,813 B2 | 6/2009 | Synder, Jr. et al. |
| 7,598,646 B2 | 10/2009 | Cleveland |

(Continued)

*Primary Examiner* — Michael Zarroli
(74) *Attorney, Agent, or Firm* — Peter Kramer (57) ABSTRACT

Halbach array electric motor with substantially contiguous electromagnetic cores, comprised of rotors and stators usually configured as permanent magnet and electromagnetic Halbach arrays respectively, wherein the enhanced magnetic forces of said Halbach arrays are focused between said rotors and stators.

22 Claims, 8 Drawing Sheets

(56) References Cited

U.S. PATENT DOCUMENTS

| | | |
|---|---|---|
| 8,009,001 B1 | 8/2011 | Cleveland |
| 8,183,731 B2 | 5/2012 | Epstein |
| 8,513,849 B2 | 8/2013 | Epstein et al. |
| 9,558,876 B2* | 1/2017 | Catalan ............... H01F 3/10 |
| 2014/0285034 A1* | 9/2014 | Krop ................ H02K 41/031 |
| | | 310/12.18 |
| 2015/0048705 A1* | 2/2015 | Davey ............... H02K 21/021 |
| | | 310/156.07 |
| 2015/0171694 A1* | 6/2015 | Walsh ................. H02K 3/47 |
| | | 310/156.43 |
| 2016/0065043 A1* | 3/2016 | Lu ..................... H02K 21/24 |
| | | 318/135 |
| 2016/0070181 A1* | 3/2016 | Frissen ............. G03F 7/70758 |
| | | 355/72 |
| 2016/0181879 A1* | 6/2016 | Zucker ................ H02P 9/00 |
| | | 310/68 B |
| 2016/0211710 A1* | 7/2016 | Hibbs .................. H02K 1/27 |
| 2016/0380523 A1* | 12/2016 | Hunter .............. H02K 41/031 |
| | | 310/12.18 |

\* cited by examiner

HALBACH ARRAY ELECTRIC MOTOR WITH SUBSTANTIALLY CONTIGUOUS ELECTROMAGNETIC CORES

CROSS-REFERENCE TO RELATED APPLICATIONS

This application is a Continuation of Nonprovisional application Ser. No. 14/014,153 filed Aug. 29, 2013. The contents of U.S. Ser. No. 14/014,153 are expressly incorporated herein by reference.

BACKGROUND OF THE INVENTION

Field of the Invention

This inventive subject matter relates to electromagnetic devices such as electric motors and generators which employ Halbach arrays. This inventive subject matter further relates to novel Halbach array electric motors and devices with electromagnetic cores. Generally the purpose of implementing Halbach arrays in electric motors is to maximize efficiency, increase power or to reduce size and weight by harnessing the enhanced magnetic forces inherent in the Halbach effect.

Description of Related Art Including Information Disclosed Under 37 CFR 1.97 and 1.98

U.S. Pat. No. 8,513,849 including U.S. Pat. Nos. 8,183,731 and 7,352,096 are very similar, and discloses generators where permanent magnets are mounted on discs but spaced relatively far apart such that it is unlikely to provide a strong Halbach array effect. The electromagnets used are non-Halbach. None of the drawings in these patents depict a valid Halbach array sequence and therefore these devices likely cannot produce a Halbach effect.

U.S. Pat. Nos. 6,906,446 and 6,858,962 are almost identical, and discloses a generator featuring a permanent magnet Halbach array on the stator, but the rotor is non-Halbach and therefore the rotor does not provide the advantages of the Halbach effect.

U.S. Pat. No. 7,598,646 discloses a bicycle wheel equipped with a Halbach array, where the motive force for the bicycle wheel are two external arches comprised of electromagnets that are arranged in Halbach Array formation, on either side. However, the electromagnetic cores of these electromagnets are physically separated and this substantially negates the Halbach effect. Electromagnets configured as such will exhibit a severely disabled Halbach effect.

U.S. Pat. No. 8,009,001 discloses a means of concentrating Halbach Arrays to create a 'hyper' Halbach using permanent magnet arrays. The invention of U.S. Pat. No. 8,009,001 does not disclose use of electromagnets in Halbach Array configuration.

Launchpoint Technologies developed a closed electric hub motor for unmanned aerial vehicles (UAVs) that uses two backing plates equipped with permanent magnets in Halbach array sequence sandwiching a non-Halbach array stator that has three phase Litz wire winding. This reference does not disclose use of electromagnets in Halbach Array configuration.

None of the devices of the prior art disclose use of electromagnets or electromagnets in Halbach Array sequence in which the Halbach effect is effectively harnessed such that enhancement and cancellation are comparable to the effects seen with prior art permanent magnets in Halbach Array sequence.

BRIEF SUMMARY OF THE INVENTION

The inventive subject matter of this disclosure describes novel Halbach array electromagnetic devices with electromagnetic cores in Halbach array sequence. These novel electromagnetic devices may also include permanent magnets in Halbach array in addition to at least one Halbach array of electromagnets. These devices further include configurations wherein enhanced magnetic forces of the Halbach arrays are paired. Applications include an in-wheel electric motor as one sample implementation thereof. Generally the goal of implementing Halbach arrays in electric motors is to maximize efficiency, increase power or to reduce size and weight by harnessing the enhanced magnetic forces inherent in the Halbach effect; otherwise an ordinary unenhanced motor would suffice. The embodiments disclosed herein utilize electromagnets arranged in Halbach Array configuration having magnetic flux conduits that provide substantial contiguity between adjacent electromagnetic cores in order to fully enable the Halbach effect and achieve increases in efficiency and power that have not been attained by prior art devices employing conventional electromagnets.

REFERENCE NUMERALS IN DRAWINGS

9 Magnetic surfaces
97 Vertical electromagnets in stator
99 Horizontal electromagnets in stator
101 Permanent magnets arranged in Halbach Array sequence (of the rotor)
102 Electromagnets arranged in Halbach Array sequence (of the stator)
103 Alloy wheel
104 Three-phase cables and optional Hall sensor cables from the stator
105 Stator mounting
204 Epoxy adhesive or filling
205 Alloy flanges
301 Orientation of Halbach array permanent magnets
302 Orientation of Halbach array electromagnets 303 Attachment point for the stator mounting
401 Thin section bearings
402 Bearing linkages and mounting points
403 Spoke-less alloy wheel
501 Magnetic coils
502 Vertical electromagnets of the stator
503 Horizontal electromagnets of the stator
504 Fork-like prongs on the horizontal cores

DETAILED DESCRIPTION OF THE INVENTION

A first embodiment is disclosed having dual Halbach array arrangement in an in-wheel electric motor. The device is comprised of magnetic surfaces 9 which are further comprised of permanent magnets or electromagnets in Halbach array configurations. The dual Halbach array is comprised of permanent magnets arranged in Halbach array sequence 101, paired with electromagnets with substantially contiguous cores, likewise arranged in Halbach array sequence 102. Compared to ordinary permanent magnets or electromagnets with equal polar fields (i.e. 50% north pole and 50% south pole), in a Halbach array, the magnetic field on one side of the array is augmented or enhanced (the enhanced side) for example, to greater than 97%, while the opposite side (cancelled side) exhibits cancellation or reduction of the magnetic field to less than 3%. Analogously the enhanced side of a Halbach array sequence of electromagnets with substantially contiguous cores as shown may also be called the active side and the cancelled side may also be called the inactive side. However, the identity of active and inactive sides of a Halbach array sequence of electromagnets is not permanently fixed as in the case with permanent magnets arranged in Halbach array sequence. In some embodiments incorporating vertical and horizontal electromagnets with substantially contiguous cores arranged in Halbach array sequence, active and inactive sides may switch or interchange positions by reversing polarity of only the horizontal electromagnets. The terms, enhanced side, cancelled side, active side, and inactive sides, which are used in this written description, should be understood to conform to lexicography as defined immediately above. It should also be noted that what is meant by "substantial contiguity" is achieved by providing physical contact between adjacent electromagnet cores using magnetic flux conduits which physically connect adjacent cores to each other. The magnetic flux conduits may be configured as fork-like prongs, protrusions, or other suitable configurations.

Figure 1A:
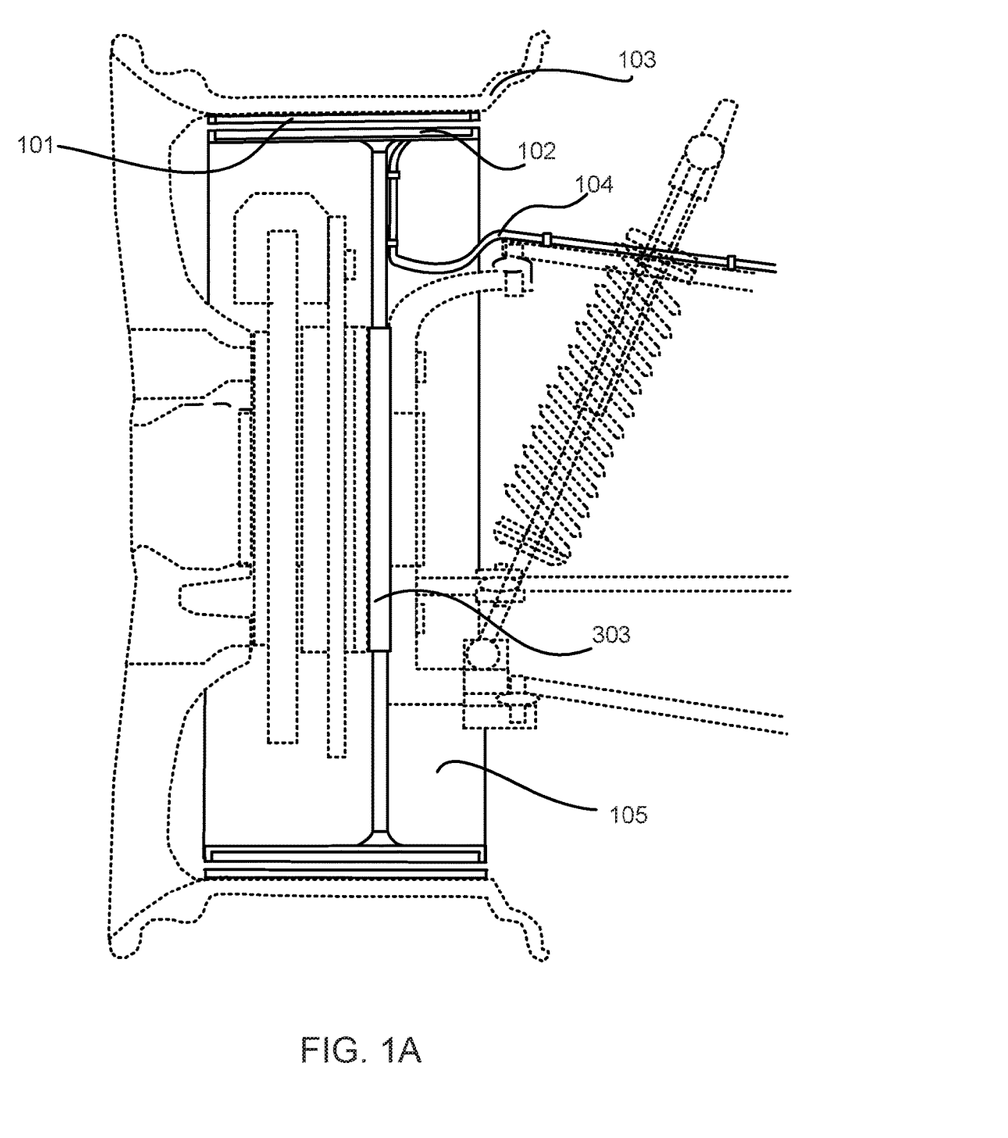
FIG. 1A Cut-away view of dual Halbach array motor in an in-wheel embodiment with cylindrical rim.
Figure 1B:
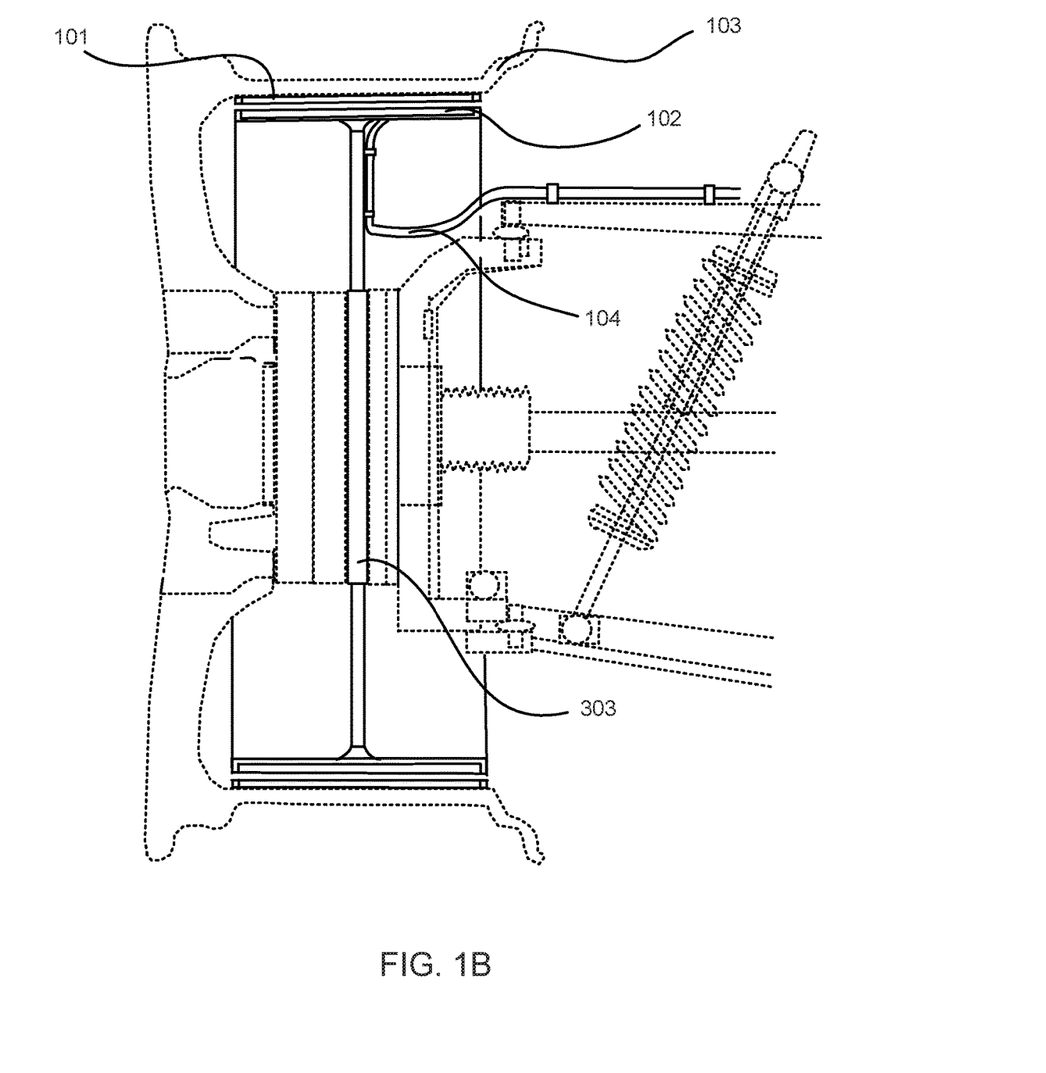
FIG. 1B Cut-away view of dual Halbach array motor an in-wheel embodiment with cylindrical rim and stator with center-mounting.

FIG. 1 shows one embodiment of the present invention with a dual Halbach array electric motor positioned in-wheel. This design can be made by modification of a common automotive alloy wheel 103, and lining a section of the inner rim's circumference with permanent magnets arranged in a Halbach array sequence 101 to form a rotor. The permanent magnets are securely affixed onto the alloy wheel 103, applying epoxy adhesive 204 to the surface and via alloy flanges 205 that are bolted, welded, or built into the alloy wheel. A stator is paired with the rotor, the stator comprised of electromagnets that are arranged in Halbach array sequence 102, the electromagnet Halbach array having horizontal electromagnets 503 (FIG. 5A) adjacent to vertical electromagnets 502. The horizontal electromagnets 503 are equipped with fork-like prongs that slip through gaps in the magnetic coils 501 of the adjacent vertical electromagnets. By establishing substantial contiguity between the electromagnetic cores, the transmission of magnetic flux between cores, which would normally be blocked by the energized coils, is maximized thereby enabling a strong Halbach array effect in the stator.

Figure 6A:
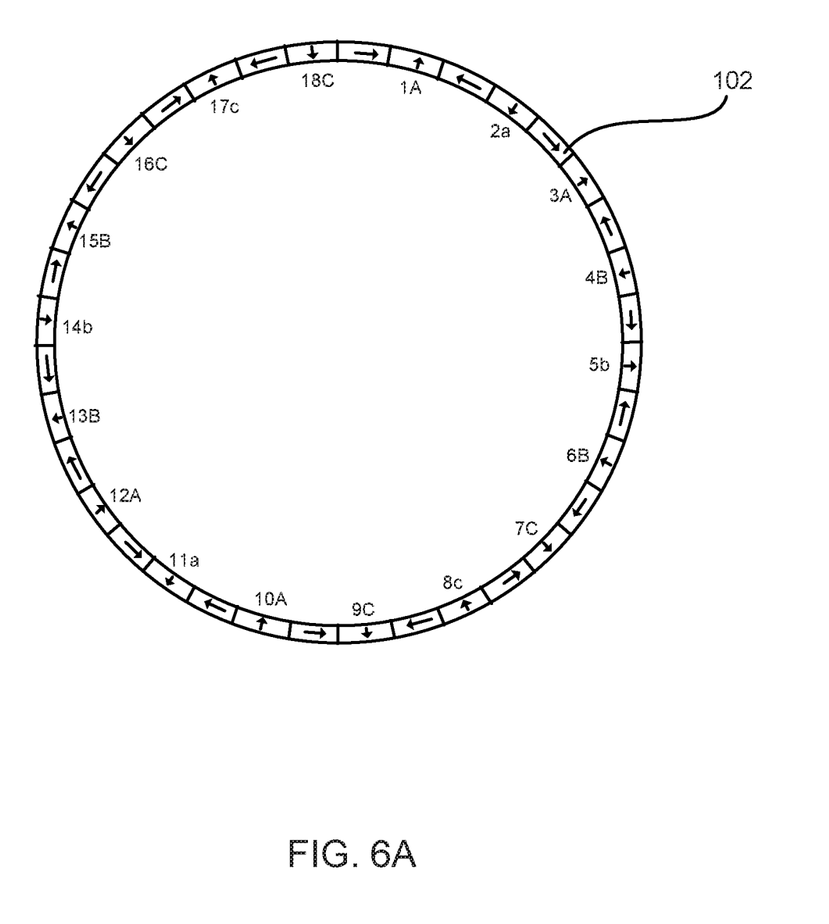
FIG. 6A Codes used for winding magnetic coils around the electromagnets.

The magnetic coils 501 of each vertical electromagnet 502 are wound according to the arrangement shown in FIG. 6A. The same wiring instructions will also be used for the horizontal electromagnets 503. There are many other wiring options such as Star/Wye, Delta, LRK, etc., and the choice substantially affects the characteristics, such as speed, peak torque, and current drawn, of the electric motor. For this first embodiment, the 'star or wye' winding for a brushless DC motor is used.

There are three separate wiring phases, A, B, and C. Winding is clockwise if the letter is capitalized, and counter clockwise if the letter is in lower case in FIG. 6A. For example, AaBbCc means: For Phase 'A'/Wire 1, wind the tooth/core 1 clockwise, then continue to tooth/core 2 and wind it counter clockwise. For Phase 'B'/Wire 2, wind the tooth/core 3 clockwise, then continue to tooth/core 4 and wind it counter clockwise. For Phase 'C'/Wire 3, wind tooth/core 5 clockwise, then continue to tooth/core 6 and wind it counter clockwise. This will continue until all the cores are properly wound.

Figure 7A:
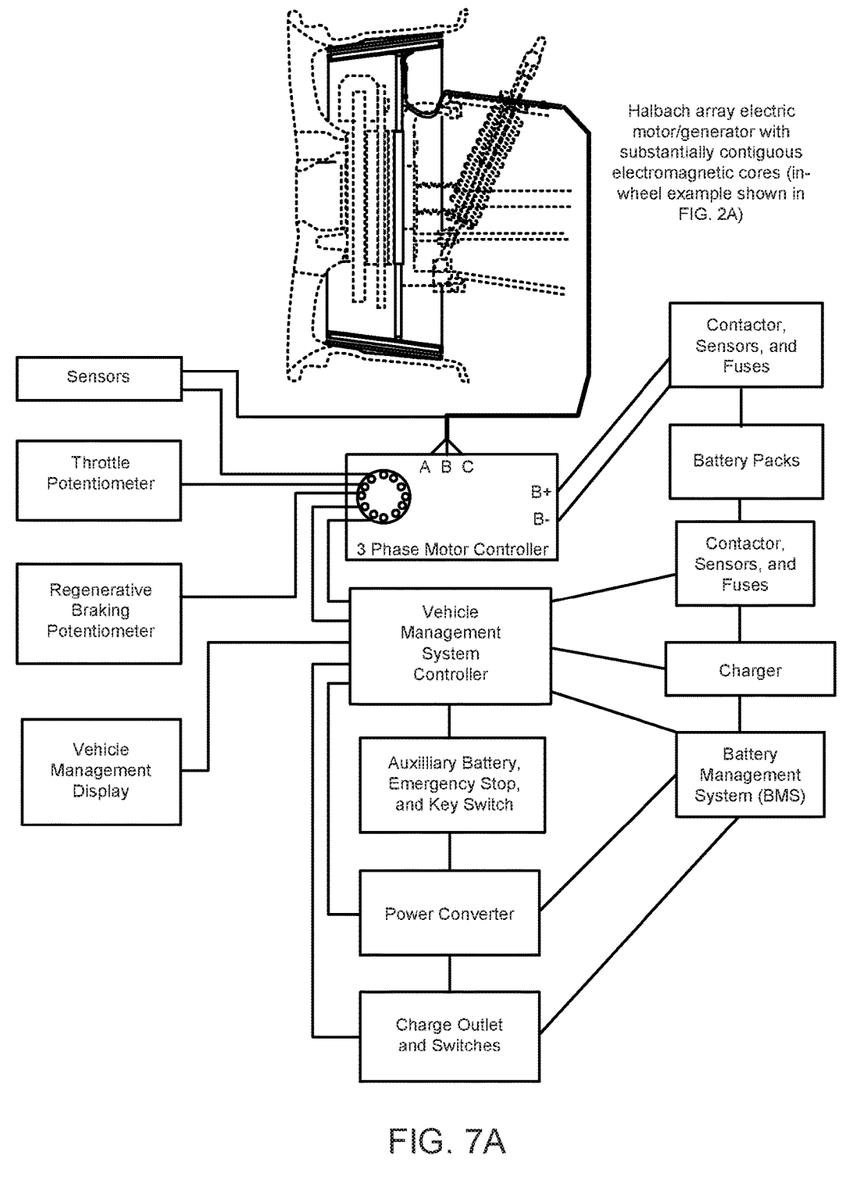
FIG. 7A A dual Halbach array motor in an in-wheel embodiment with connections to a 3-phase motor controller.

Once the cores are properly wound the three phase wires A, B, and C will be soldered together to complete the 'star or wye' winding scheme. Then the other end of the same combined three phase wires A, B, and C for both vertical 502 and horizontal 503 electromagnets will be separately connected to the A, B, and C terminals on the 3-phase motor controller shown in FIG. 7A.

Sensorless commutation using a sensorless controller such as Texas Instruments™ InstaSpin™ controllers is used in this first embodiment. Hall sensors, while optional in this example, are recommended if a fine degree of control is required at low rotational speeds.

Figure 3A:
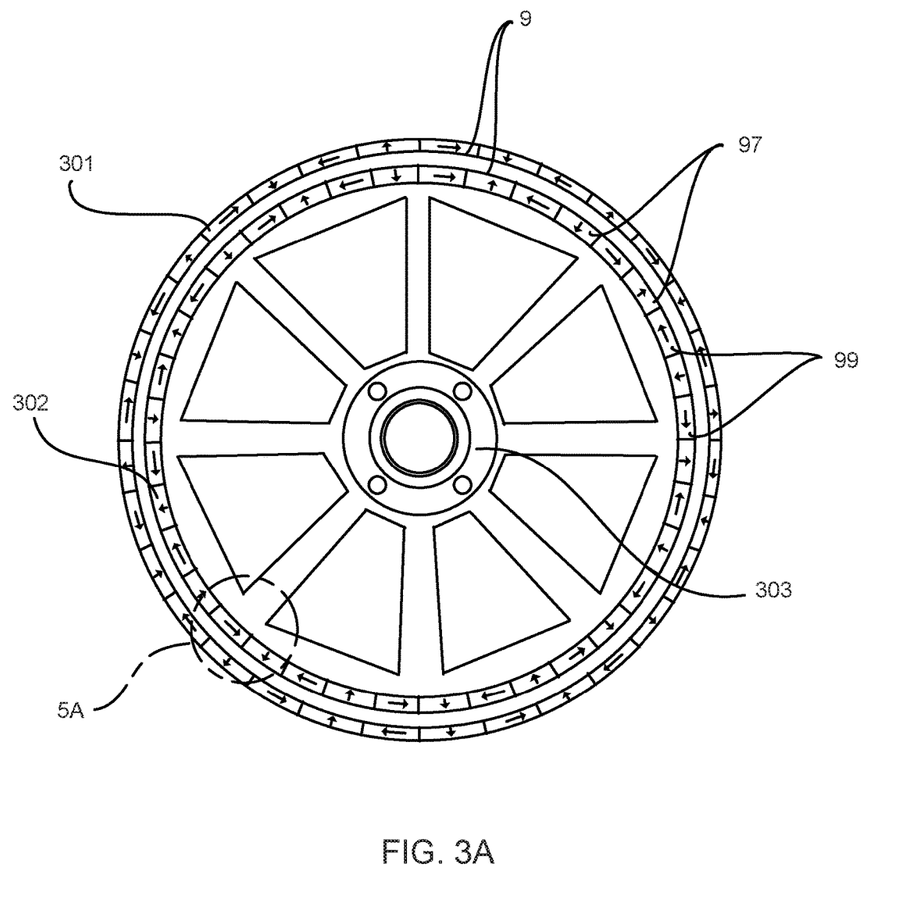
FIG. 3A Orientation of Halbach array permanent magnets and Halbach array electromagnetic cores.
Figure 5A:
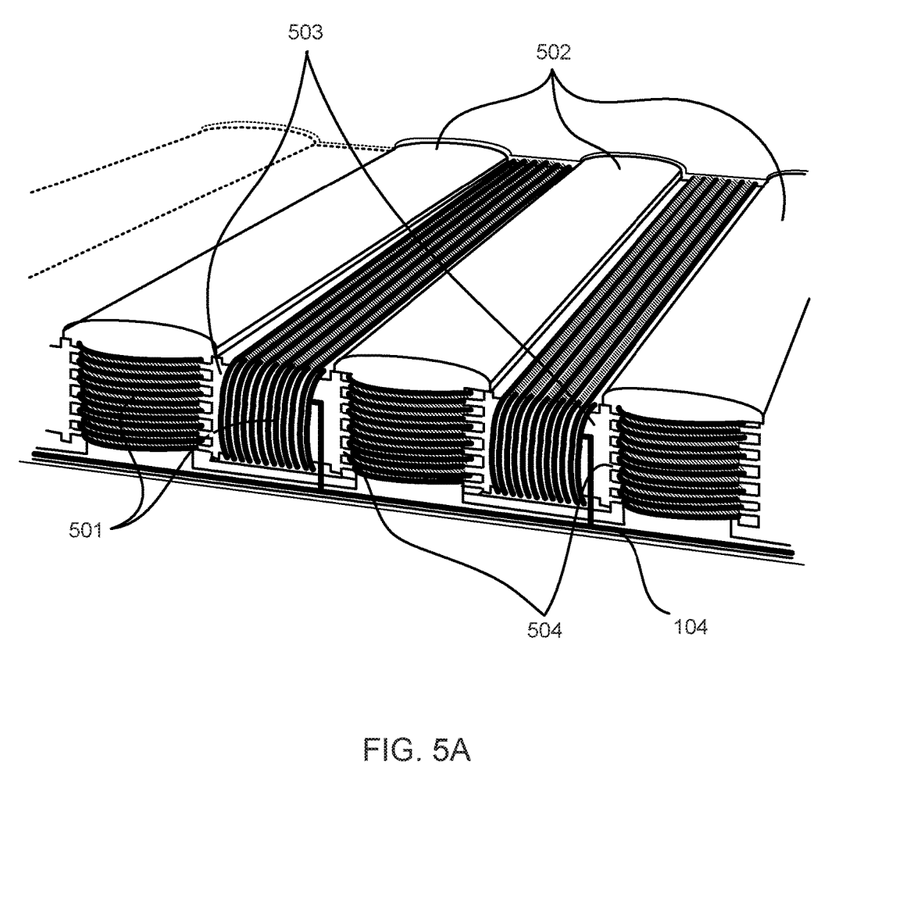
FIG. 5A Detailed close-up view of the electromagnets with horizontal and vertical cores showing fork-like flux conduits extending from the horizontal cores to the vertical cores.

One orientation of the Halbach array permanent magnets 301, in relation to the orientation of the Halbach array electromagnets 302 can be found in FIG. 3A, which shows the orientation for 32 Halbach array permanent magnets (essentially 16 primary poles on the outer ring), and the orientation of each of the 36 Halbach array electromagnetic cores (effectively 18 vertical primary electromagnetic cores on the inner ring). This Halbach array arrangement with arrays 301 and 302 oriented as shown can be described as having a dual Halbach array arrangement with facing paired enhanced sides. This configuration focuses all of the enhanced magnetic flux at the airgap (i.e. the space between the stator and rotor) to maximize power and efficiency. FIG. 3A also shows a variation of the first embodiment with the stator mounting having a central attachment point for the stator mounting 303. FIG. 3A also shows the source of the detailed close up view of the electromagnets shown in FIG. 5A. It should also be noted that for Halbach arrays arranged in a circular fashion in a rotor or stator, the "horizontal" magnets are oriented with magnetization essentially parallel to the circumference of the circle formed by the magnets. Because the outer edge of a circle cannot form a perfectly straight line, the directions of magnetization of the horizontal magnets are actually parallel to lines tangent to the circle. See for example, horizontal electromagnets 99 shown in the embodiment depicted in FIG. 3A. The "vertical" magnets are arranged with magnetization pointing outward or inward along lines extending radially from the center of the circle as shown for electromagnets 97. The terms, "horizontal" and "vertical" are therefore used as would be customary and would be familiar to a person of ordinary skill in the art and does not imply that the adjacent horizontal and vertical magnets are arranged with magnetization perfectly perpendicular to each other in but instead, substantially perpendicular according to the circular geometry of the device. For embodiments involving linear devices adjacent horizontal and vertical magnets would be arranged with magnetization perpendicular to each other. It should be further noted that ordinary electric motors in general use only vertically oriented permanent magnets and electromagnets. FIG. 3A illustrates horizontal and vertical permanent magnets and electromagnets oriented in Halbach array sequences. Vertical and horizontal electromagnets in Halbach array sequence are also shown in FIG. 5A.

The entire set of electromagnets arranged in Halbach array sequence (i.e. the stator) 102 including the full length of the three-phase cables and optional Hall sensor cables from the stator 104 will generally be coated several times with insulating and waterproofing polymers and water phobic solutions similar to that offered by Liquipel™ and HzO™.

Figure 2A:
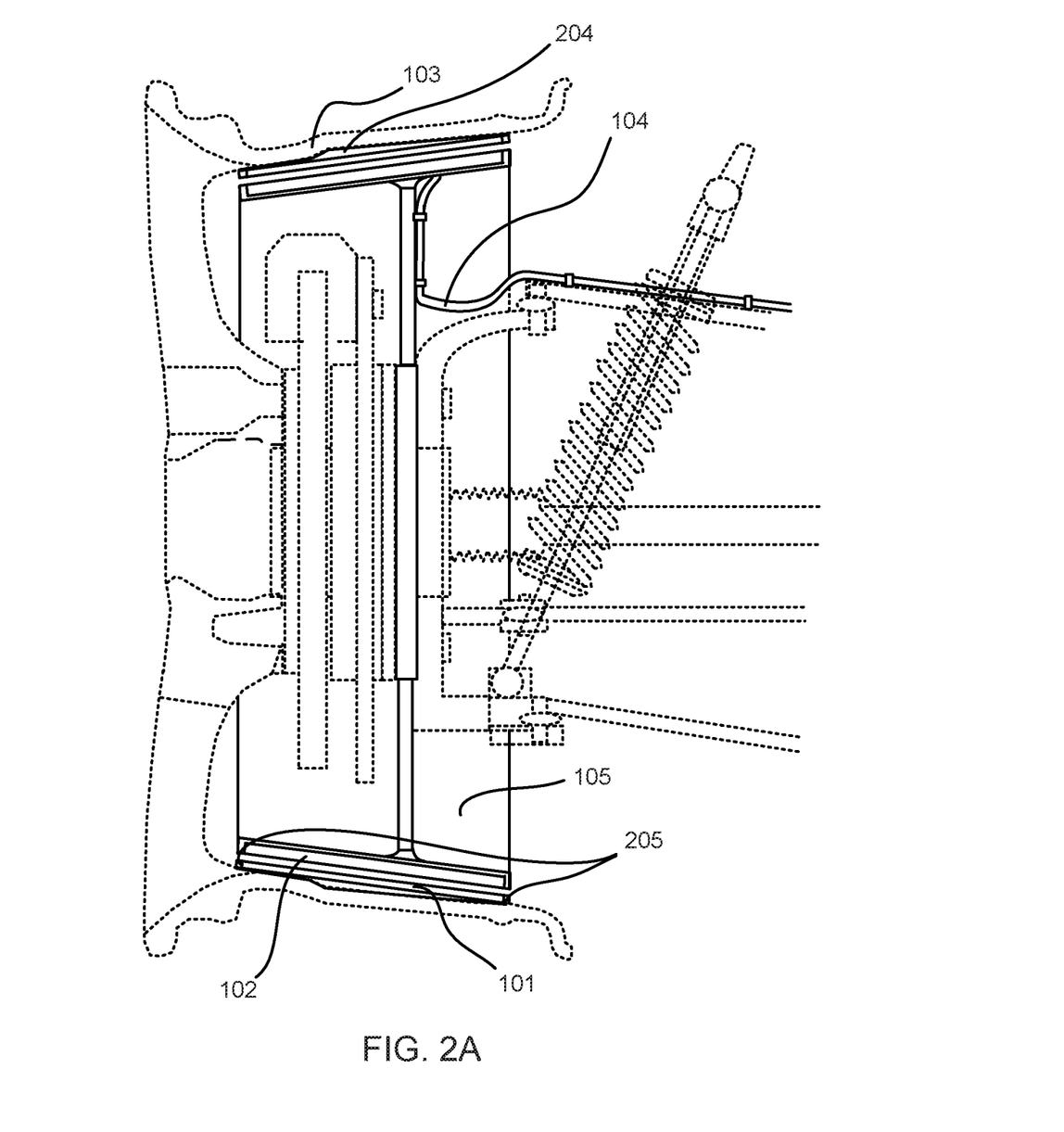
FIG. 2A Cut-away view of dual Halbach array motor an in-wheel embodiment with funnel-shaped inner rim.

The completed Halbach array stator 102 is then placed on a stator mounting 105 that is shaped to match the inner rim of the alloy wheel 103, which is then affixed via the stator assembly's attachment point 303 to the vehicle's front or rear suspension system, typically at the steering knuckle assembly or hub carrier. The attachment for the stator mounting is offset more towards the vehicle's body so that a conventional brake rotor and caliper and suspension system can still be used. The same attachment point can be positioned closer to the body of the car to accommodate the brake rotors and calipers, as shown in FIG. 1A for an alloy wheel 103 with a cylindrical rim and FIG. 2A for an alloy wheel 103 with a funnel shaped rim. If the brakes are positioned inboard, attachment point for the stator 303 will be at the center of the rim width, as shown in FIG. 1B. This configuration will decrease unsprung weight and to improve handling even further.

Figure 4A:
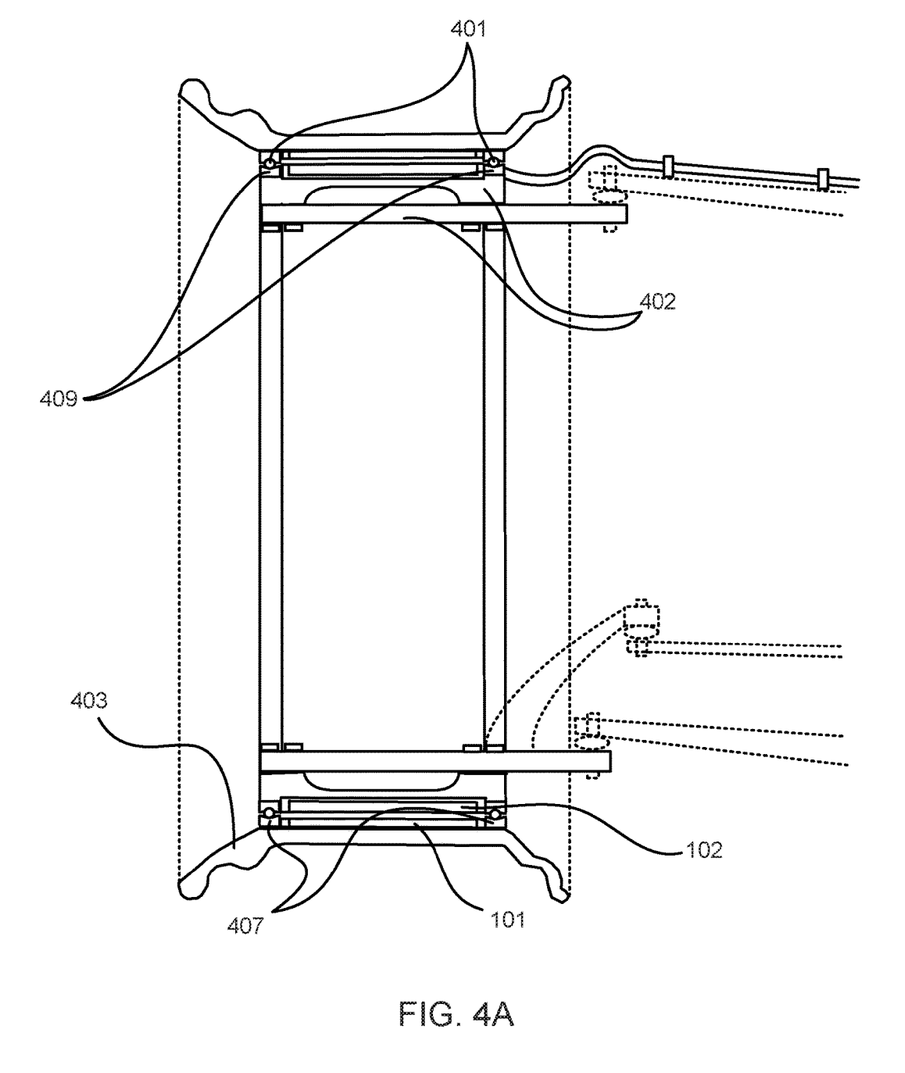
FIG. 4A An embodiment with a spoke-less alloy wheel.

Another embodiment variation is made by using thin section bearings 401 mounted along the inner rim of a spoke less alloy wheel 403. These thin section bearings 401 are joined via linkages that also serve as mounting points 402 for the vehicle's suspension system. The permanent magnets of the rotor 101 are then positioned between the outer rings 407 of the thin section bearings 401, and the electromagnets of the stator 102 are positioned between the inner rings 409 of the thin section bearings 401, as shown in FIG. 4A. Equivalent alternatives to thin section bearings may be used varying with design. These would include but are not limited to hydrostatic, hydrodynamic, magnetic, rolling contact bearings, sleeves, journals, sliding faces or paired grooves which may be lined with or fabricated from ceramic or other low friction materials. Brakes similar to disc brakes such as made by Brembo™ for use on large sports bikes are not shown in the diagram for the sake of clarity.

Another embodiment for the present invention can be made by simply inverting the configuration of the first embodiment using a contiguous core electromagnetic Halbach array as the outer stator, and a permanent magnet Halbach array as the inner rotor. Likewise, aside from the preceding outward and inward radial embodiments, another example is for the Halbach stator to project its force axially, which will then be paired with an axially-oriented permanent magnet Halbach array in the rotor.

Yet another embodiment is adapted for connection to an AC motor controller rather than DC. The wiring of the electromagnetic cores (which are still configured as Halbach arrays) will be changed to near-90 degree phases to achieve fields that are near sinusoidal (and near cosusoidal), to create a three-phase synchronous AC contiguous core Halbach array electric motor.

An interesting embodiment of the present invention is to fully harness both sides of the contiguous core Halbach array electromagnet (i.e. a stator), since this can easily be done by separately wiring the vertical and horizontal Halbach array electromagnets' phases to dual channel motor controllers, or multiple controllers working simultaneously via a bus or signal network. As an example, by sandwiching the stator between two concentric permanent magnet rotors (which are Halbach arrays) and by connecting armatures to both rotors, alternating vertical movement can be provided while radially rotating in either direction, with a considerable speed and torque. These external and internal Halbach rotors, if not interconnected can also be made to function independently albeit sequentially, uniquely controlled via a single Halbach stator. These novel configurations open up a multitude of possibilities for new applications or devices in the field of pumps, transmissions, clutches, couplings, drill heads, robotics, etc.

I claim:

1. An electric motor or generator comprising,
   a stator and a rotor,
   a first Halbach array, said first Halbach array further comprised of,
   (i) a plurality of horizontal electromagnets and a plurality of horizontal electromagnetic cores, said horizontal electromagnets further comprised of said horizontal electromagnetic cores and magnetic coils,
   (ii) a plurality of vertical electromagnets and a plurality of vertical electromagnetic cores, said vertical electromagnets further comprised of said vertical electromagnetic cores and magnetic coils,
   (iii) magnetic flux conduits, said magnetic flux conduits comprised of fork-like prongs, said fork-like prongs protruding from said horizontal electromagnetic cores,
   (iv) said magnetic flux conduits with said fork-like prongs configured to provide substantial contiguity with adjacent vertical electromagnetic cores, wherein said fork-like prongs physically contact adjacent vertical electromagnetic cores,
   said stator further comprised of said first Halbach array,
   a second Halbach array, said second Halbach array comprised of either electromagnets or permanent magnets,
   said rotor further comprised of said second Halbach array, and
   said motor or generator further configured with said first Halbach array and said second Halbach array arranged with paired facing enhanced sides.

2. The electric motor or generator of claim 1 further comprising,
   an in-wheel motor.

3. The motor or generator of claim 2 further comprising,
   a configuration wherein said second Halbach array is comprised of permanent magnets forming said rotor, said second Halbach array either mounted onto or embedded into an inner rim of a wheel.

4. The electric motor or generator of claim 3 further comprising,
   a configuration wherein said stator is comprised of said first Halbach array, and said stator being connected to a vehicle's suspension.

5. The electric motor or generator of claim 3 further comprising, a configuration wherein said stator is comprised of said first Halbach array, and said stator being connected either at the steering knuckle assembly or at the hub carrier of a vehicle.

6. The electric motor or generator of claim 2 further comprising,
a plurality of thin-section bearings, each of said bearings having an outer ring and having an inner ring,
with said outer ring positioned along an inner rim of a spoke-less wheel, said rotor further comprised of said second Halbach array which is in turn comprised of permanent magnets, with said permanent magnets either mounted onto or embedded into an inner rim of said spoke-less wheel alongside said thin-section bearings, and
said stator further comprised of said first Halbach array, with said stator supported alongside said inner rings of said bearings.

7. The electric motor or generator of claim 2 further comprising,
a plurality of means to reduce friction and to constrain the motion of said rotor about said stator, selected from the group consisting of, hydrostatic, hydrodynamic, magnetic, rolling contact bearings, sleeves, journals, sliding faces, and paired grooves, and
said rotor further comprised of said second Halbach array which is in turn comprised of permanent magnets, with said permanent magnets either mounted on or embedded into an inner rim of the wheel, and
said stator further comprised of said first Halbach array, with said stator supported by said plurality of means to reduce friction.

8. An electromagnetic device comprising,
a plurality of horizontal electromagnets comprised of a plurality of horizontal cores and magnetic coils,
a plurality of vertical electromagnets comprised of a plurality of vertical cores and magnetic coils,
said plurality of vertical electromagnets and said plurality of horizontal electromagnets arranged to form a first Halbach array,
a plurality of magnetic flux conduits comprised of fork-like prongs, said fork-like prongs protruding from said horizontal cores of said horizontal electromagnets which thereby provide substantial contiguity through physical contact between said horizontal cores and said vertical cores in said first Halbach array,
a second Halbach array of magnets, said second array of magnets comprised of either permanent magnets or electromagnets,
said electromagnetic device configured wherein the enhanced sides of said first Halbach array and said second Halbach array are facing each other.

9. The electromagnetic device of claim 8 further comprising,
wherein said electromagnetic device is a motor or generator.

10. The electromagnetic device of claim 9 further comprising,
an in-wheel motor.

11. The electromagnetic device of claim 10 further comprising,
a configuration wherein said second Halbach array is comprised of permanent magnets forming said rotor, said second Halbach array either mounted on or embedded into an inner rim of a wheel.

12. The electromagnetic device of claim 11 further comprising, a configuration wherein said stator is comprised of said first Halbach array, and
said stator being connected to a vehicle's suspension.

13. The electromagnetic device of claim 11 further comprising,
a configuration wherein said stator is comprised of said first Halbach array, and
said stator being connected either at the steering knuckle assembly or at the hub carrier of a vehicle.

14. The electromagnetic device of claim 10 further comprising,
a plurality of thin-section bearings, each of said bearings having an outer ring and having an inner ring,
with each said outer ring mounted along an inner rim of a spoke-less wheel,
said rotor further comprised of said second Halbach array which is in turn comprised of permanent magnets, with said permanent magnets mounted onto or embedded into an inner rim of the wheel alongside said thin-section bearings, and
said stator further comprised of said first Halbach array, with said stator supported alongside said inner rings of said bearings.

15. The electromagnetic device of claim 10 further comprising,
a plurality of means to reduce friction and to constrain the motion of said rotor about said stator, selected from the group consisting of, hydrostatic, hydrodynamic, magnetic, rolling contact bearings, sleeves, journals, sliding faces, and paired grooves,
said rotor further comprised of said second Halbach array which is in turn comprised of permanent magnets, with said permanent magnets either mounted on or embedded into an inner rim of the wheel, and
said stator further comprised of said first Halbach array, with said stator supported by said plurality of means to reduce friction.

16. An electromagnetic device comprising,
a plurality of magnetic surfaces,
with each said magnetic surface predetermined and configured to be either stationary or movable,
with each of said magnetic surfaces further comprised of Halbach arrays,
with each of said Halbach arrays being predetermined to be comprised of either permanent magnets or electromagnets arranged in Halbach array sequence, with at least one of said magnetic surfaces comprised of electromagnets arranged in Halbach arrays sequence,
wherein said Halbach array sequence comprised of said electromagnets is further comprised
with said electromagnets being arranged with alternately adjacent vertical and horizontal
electromagnetic cores, and with each of said alternately adjacent vertical and horizontal electromagnetic cores wrapped in magnetic coils,
said horizontal electromagnetic cores having fork-like prongs, wherein said fork-like prongs provide substantial contiguity through physical contact between said alternately adjacent vertical and horizontal electromagnetic cores, and
wherein a predetermined set of said magnetic surfaces are further configured such that enhanced sides of said Halbach arrays interact.

17. A Halbach array electric motor or generator with substantially contiguous electromagnetic cores comprising,
a plurality of stators and a plurality of rotors,
a plurality of Halbach arrays, with each of said Halbach arrays predetermined to be comprised of either permanent magnets or electromagnets in Halbach array sequence, with at least one of said Halbach arrays predetermined to be comprised of said electromagnets, said Halbach array sequence comprised of said electromagnets further comprised wherein said electromagnets are arranged with alternately adjacent horizontal and vertical electromagnetic cores, and with each of said alternately adjacent vertical and horizontal electromagnetic cores wrapped in magnetic coils, said horizontal electromagnetic cores having fork-like prongs, wherein said fork-like prongs provide substantial contiguity through physical contact between said alternately adjacent vertical and horizontal electromagnetic cores, said stators further comprised of said Halbach arrays comprised of said electromagnets in Halbach array sequence, said rotors predetermined to be further comprised of either said permanent magnets in Halbach array sequence or said electromagnets in Halbach array sequence, and wherein said electric motor or generator is further configured such that the enhanced magnetic forces of said Halbach arrays are focused between said rotors and said stators.

18. The electric motor or generator of claim 17 further comprising, an in-wheel motor.

19. The electric motor or generator of claim 18 further comprising, a configuration wherein each of said rotors are predetermined to be either mounted on to or embedded into an inner rim of a wheel.

20. The electric motor or generator of claim 19 further comprising, a configuration wherein each of said stators is connected to either a vehicle's wheel hub assembly or to a steering knuckle.

21. The electric motor or generator of claim 18 further comprising, a plurality of thin-section bearings, each of said bearings having an outer ring and having an inner ring, with each said outer ring along an inner rim of a spoke-less wheel, with each of said rotors configured to be either mounted on to or embedded into an inner rim of said spoke-less wheel alongside said thin-section bearings, and with each of said stators further configured to be supported between said inner rings of said thin section bearings.

22. The electric motor or generator of claim 17 further comprising, a plurality of means to reduce friction and to constrain the motion of said rotor about said stator, selected from the group consisting of, hydrostatic, hydrodynamic, magnetic, rolling contact bearings, sleeves, journals, sliding faces, and paired grooves, and with each of said rotors and each of said stators predetermined to be further comprised and supported by said plurality of means to reduce friction.

* * * * *